United States Patent
Jiang et al.

(10) Patent No.: US 10,600,257 B2
(45) Date of Patent: Mar. 24, 2020

(54) METHOD AND APPARATUS FOR MONITORING OF AN AUTONOMOUS VEHICLE

(71) Applicant: GM Global Technology Operations LLC, Detroit, MI (US)

(72) Inventors: Shengbing Jiang, Rochester Hills, MI (US); Mutasim A. Salman, Madison, WI (US); Xinyu Du, Oakland Township, MI (US); Wen-Chiao Lin, Rochester Hills, MI (US); Jinsong Wang, Troy, MI (US); Shuqing Zeng, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 207 days.

(21) Appl. No.: 15/688,467

(22) Filed: Aug. 28, 2017

(65) Prior Publication Data

US 2019/0066396 A1    Feb. 28, 2019

(51) Int. Cl.
  *G07C 5/00*   (2006.01)
  *G01S 1/00*   (2006.01)
  *G05D 1/00*   (2006.01)
  *G07C 5/08*   (2006.01)

(52) U.S. Cl.
  CPC ............... *G07C 5/00* (2013.01); *G01S 1/00* (2013.01); *G05D 1/0088* (2013.01); *G07C 5/0808* (2013.01); *G05D 2201/0213* (2013.01); *G07C 5/008* (2013.01)

(58) Field of Classification Search
  USPC .......................................... 701/23
  See application file for complete search history.

(56) References Cited

U.S. PATENT DOCUMENTS

| | | | | |
|---|---|---|---|---|
| 2007/0282506 A1* | 12/2007 | Breed | ............ | B60N 2/028 701/45 |
| 2008/0144944 A1* | 6/2008 | Breed | ............ | G06K 9/00369 382/224 |
| 2009/0092284 A1* | 4/2009 | Breed | ............ | B60J 10/00 382/103 |
| 2019/0066396 A1* | 2/2019 | Jiang | ............ | G05D 1/0088 |

* cited by examiner

*Primary Examiner* — Tyler D Paige
(74) *Attorney, Agent, or Firm* — Quinn IP Law (57) ABSTRACT

An autonomic vehicle control system is described, and includes a vehicle spatial monitoring system including a subject spatial sensor that is disposed to monitor a spatial environment proximal to the autonomous vehicle. A controller is in communication with the subject spatial sensor, and the controller includes a processor and a memory device including an instruction set. The instruction set is executable to evaluate the subject spatial sensor, which includes determining first, second, third, fourth and fifth SOH (state of health) parameters associated with the subject spatial sensor, and determining an integrated SOH parameter for the subject spatial sensor based thereupon.

19 Claims, 3 Drawing Sheets

METHOD AND APPARATUS FOR MONITORING OF AN AUTONOMOUS VEHICLE

INTRODUCTION

Autonomous vehicles can include on-board monitoring systems to detect occurrence of a fault or another indication of a need for service and/or vehicle maintenance.

SUMMARY

An autonomic vehicle control system is described, and includes a vehicle spatial monitoring system including a subject spatial sensor that is disposed to monitor a spatial environment proximal to the autonomous vehicle. A controller is in communication with the subject spatial sensor, and the controller includes a processor and a memory device including an instruction set. The instruction set is executable to evaluate the subject spatial sensor, which includes determining first, second, third, fourth and fifth SOH (state of health) parameters associated with the subject spatial sensor, and determining an integrated SOH parameter for the subject spatial sensor based thereupon.

An aspect of the disclosure includes the first state of health (SOH) parameter for the subject spatial sensor being determined based upon internal monitoring thereof.

Another aspect of the disclosure includes a first field of view being associated with the subject spatial sensor.

Another aspect of the disclosure includes the second SOH parameter for the subject spatial sensor being determined based upon a correlation analysis of data generated by a second spatial sensor disposed on the autonomous vehicle, wherein the second spatial sensor has a second field of view that overlaps with a portion of the first field of view.

Another aspect of the disclosure includes the third SOH parameter for the subject spatial sensor being determined based upon history data for the subject spatial sensor that is associated with a geographic location.

Another aspect of the disclosure includes the fourth SOH parameter for the subject spatial sensor being determined based upon a correlation analysis with an input from a remote spatial sensor disposed on a remote vehicle, wherein the input from the remote spatial sensor includes data associated with the geographic location.

Another aspect of the disclosure includes the fifth SOH parameter for the subject spatial sensor being determined based upon a correlation analysis with an input from a calibration spatial sensor disposed on a calibration vehicle, wherein the input from the calibration spatial sensor includes data associated with the geographic location.

Another aspect of the disclosure includes the integrated SOH parameter for the subject spatial sensor being determined based upon a weighted average of the first, second, third, fourth and fifth SOH parameters.

Another aspect of the disclosure includes a low value for the SOH parameters being associated with a low value that is output from the correlation analysis, and a high value for the SOH parameters being associated with a high value that is output from the correlation analysis.

Another aspect of the disclosure includes determining the integrated SOH parameter for the subject spatial sensor based upon a weighted average of the first, second, third, fourth and fifth SOH parameters.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
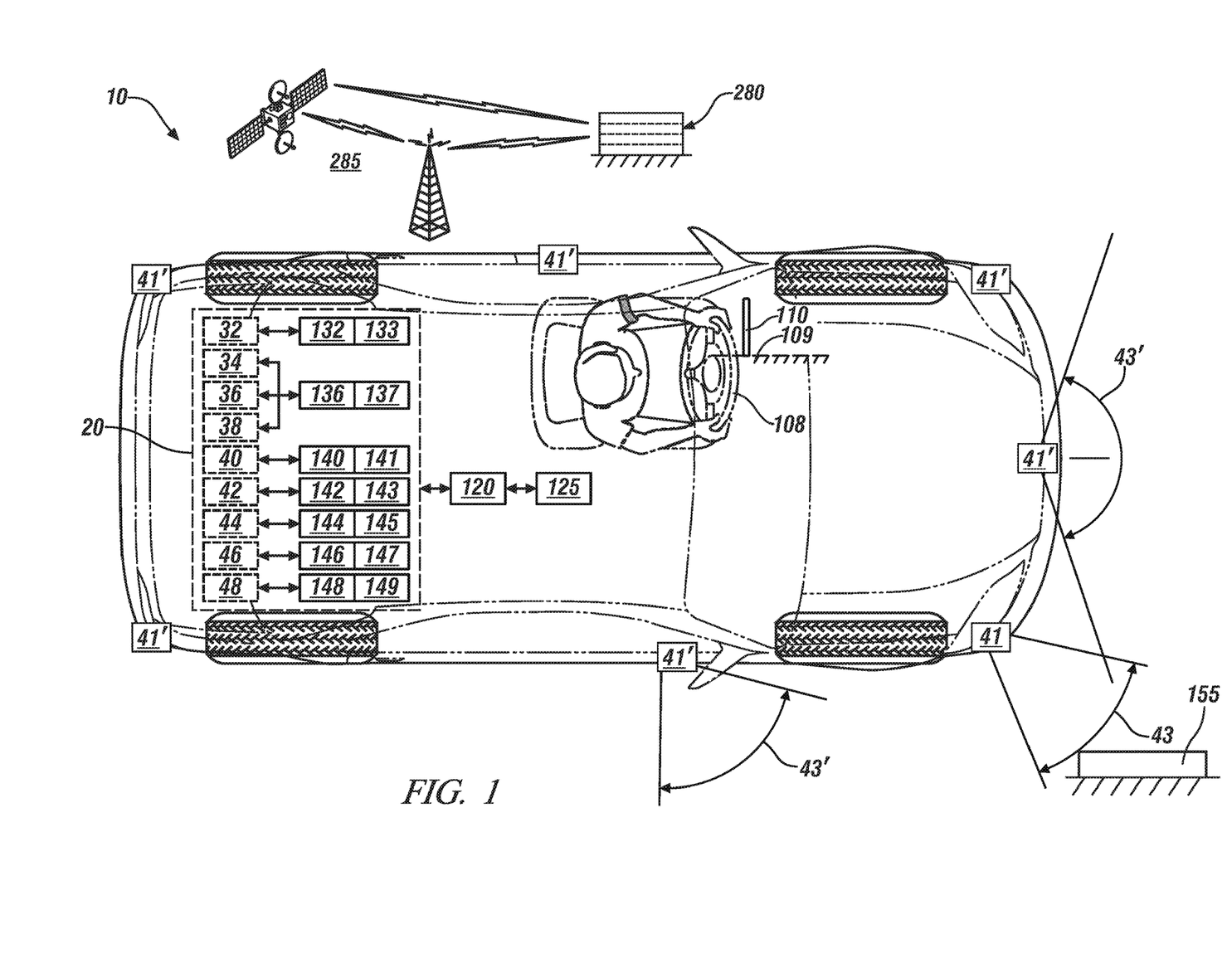
FIG. 1 schematically shows a vehicle including an autonomic vehicle control system and associated controllers, in accordance with the disclosure.

Referring to the drawings, wherein like reference numerals correspond to like or similar components throughout the several Figures, FIG. 1, consistent with embodiments disclosed herein, illustrates a vehicle 10 that includes an autonomic vehicle control system 20 and an associated vehicle health monitoring (VHM) controller 120 that is illustrative of the concepts described herein. The vehicle 10 includes, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

As employed herein, the autonomic vehicle control system 20 includes an on-vehicle control system that is capable of providing a level of driving automation. The terms 'driver' and 'operator' describe the person responsible for directing operation of the vehicle, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of vehicle driving functions, including steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The autonomic vehicle control system 20 preferably includes one or a plurality of vehicle systems and associated controllers that provide a level of driving automation, and the VHM controller 120 is disposed to monitor, prognosticate and/or diagnose operation of the autonomic vehicle control system 20. The vehicle systems, subsystems and controllers associated with the autonomic vehicle control system 20 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. The vehicle systems and associated controllers of the autonomic vehicle control system 20 can include, by way of non-limiting examples, a drivetrain 32 and drivetrain controller (PCM) 132; a steering system 34, a braking system 36 and a chassis system 38, which are controlled by a vehicle controller (VCM) 136; a vehicle spatial monitoring system 40 and spatial monitoring controller 140, a human-machine interface (HMI) system 42 and HMI controller 142; an HVAC system 44 and associated HVAC controller 144; operator controls 46 and an associated operator controller 146; and a vehicle lighting, illumination and external signaling system 48 and associated controller 148.

Each of the vehicle systems and associated controllers may further include one or more subsystems and an associated controller. The subsystems and controllers are shown as discrete elements for ease of description. The foregoing classification of the subsystems is provided for purposes of describing one embodiment, and is illustrative. Other configurations may be considered within the scope of this disclosure. It should be appreciated that the functions described and performed by the discrete elements may be executed using one or more devices that may include algorithmic code, calibrations, hardware, application-specific integrated circuitry (ASIC), and/or off-board or cloud-based computing systems. Each of the aforementioned controllers includes a VHM agent, which can be implemented and executed as algorithmic code, calibrations, hardware, application-specific integrated circuitry (ASIC), or other elements. Each of the VHM agents is configured to perform component and sub-system monitoring, feature extraction, data filtering and data recording for the associated controller. The data recording can include periodic and/or event-based data recording, single time-point data recording and/or consecutive time-point data recording for certain time duration, such as before and/or after the trigger of an event. Such data recording can be accomplished employing circular memory buffers or another suitable memory device.

The PCM 132 communicates with and is operatively connected to the drivetrain 32, and executes control routines to control operation of an engine and/or other torque machines, a transmission and a driveline, none of which are shown, to transmit tractive torque to the vehicle wheels in response to driver inputs, external conditions, and vehicle operating conditions. The PCM 132 is shown as a single controller, but can include a plurality of controller devices operative to control various powertrain actuators, including the engine, transmission, torque machines, wheel motors, and other elements of the drivetrain 32, none of which are shown. By way of a non-limiting example, the drivetrain 32 can include an internal combustion engine and transmission, with an associated engine controller and transmission controller. Furthermore, the internal combustion engine may include a plurality of discrete subsystems with individual controllers, including, e.g., an electronic throttle device and controller, fuel injectors and controller, etc. The drivetrain 32 may also be composed of an electrically-powered motor/generator with an associated power inverter module and inverter controller. The control routines of the PCM 132 may also include an adaptive cruise control system (ACC) that controls vehicle speed, acceleration and braking in response to driver inputs and/or autonomous vehicle control inputs. The PCM 132 also includes a PCM VHM agent 133.

The VCM 136 communicates with and is operatively connected to a plurality of vehicle operating systems and executes control routines to control operation thereof. The vehicle operating systems can include braking, stability control, and steering, which can be controlled by actuators associated with the braking system 36, the chassis system 38 and the steering system 34, respectively, which are controlled by the VCM 136. The VCM 136 is shown as a single controller, but can include a plurality of controller devices operative to monitor systems and control various vehicle actuators. The VCM 136 also includes a VCM VHM agent 137.

The steering system 34 is configured to control vehicle lateral motion. The steering system 34 can include an electrical power steering system (EPS) coupled with an active front steering system to augment or supplant operator input through a steering wheel 108 by controlling steering angle of the steerable wheels of the vehicle 10 during execution of an autonomic maneuver such as a lane change maneuver. An exemplary active front steering system permits primary steering operation by the vehicle driver including augmenting steering wheel angle control to achieve a desired steering angle and/or vehicle yaw angle. Alternatively or in addition, the active front steering system can provide complete autonomous control of the vehicle steering function. It is appreciated that the systems described herein are applicable with modifications to vehicle steering control systems such as electrical power steering, four/rear wheel steering systems, and direct yaw control systems that control traction of each wheel to generate a yaw motion.

The braking system 36 is configured to control vehicle braking, and includes wheel brake devices, e.g., disc-brake elements, calipers, master cylinders, and a braking actuator, e.g., a pedal. Wheel speed sensors monitor individual wheel speeds, and a braking controller can be mechanized to include anti-lock braking functionality.

The chassis system 38 preferably includes a plurality of on-board sensing systems and devices for monitoring vehicle operation to determine vehicle motion states, and, in one embodiment, a plurality of devices for dynamically controlling a vehicle suspension. The vehicle motion states preferably include, e.g., vehicle speed, steering angle of the steerable front wheels, and yaw rate. The on-board sensing systems and devices include inertial sensors, such as rate gyros and accelerometers. The chassis system 38 estimates the vehicle motion states, such as longitudinal speed, yaw-rate and lateral speed, and estimates lateral offset and heading angle of the vehicle 10. The measured yaw rate is combined with steering angle measurements to estimate the vehicle state of lateral speed. The longitudinal speed may be determined based upon signal inputs from wheel speed sensors arranged to monitor each of the front wheels and rear wheels. Signals associated with the vehicle motion states that can be communicated to and monitored by other vehicle control systems for vehicle control and operation.

The vehicle spatial monitoring system 40 and spatial monitoring controller 140 can include a controller and a plurality of spatial sensors 41, wherein each of the spatial sensors 41 is disposed on-vehicle to monitor a field of view 43 of objects and geographic regions that are proximal to the vehicle 10. A nominal subject spatial sensor is designated by numeral 41 with an associated field of view 43, and other of the spatial sensors are designated by numeral 41' with associated fields of view 43'. Each of spatial sensors described herein can be designated as the subject spatial sensor 43 in context of the routines described with reference to FIGS. 2 and 3. The spatial monitoring controller 140 generates digital representations of each of the fields of view including proximate remote objects 155 based upon data inputs from the spatial sensors. The spatial monitoring controller 140 also includes a spatial monitoring VHM agent 141. The spatial monitoring controller 140 can evaluate inputs from the spatial sensors 41 to determine a linear range, relative speed, and trajectory of the vehicle 10 in view of each proximate remote object. The spatial sensors 41 can be located at various locations on the vehicle 10, including the front corners, rear corners, rear sides and mid-sides. The spatial sensors 41 can include a front radar sensor and a camera in one embodiment, although the disclosure is not so limited. Placement of the aforementioned spatial sensors 41 permits the spatial monitoring controller 140 to monitor traffic flow including proximate vehicles and other objects around the vehicle 10. Data generated by the spatial monitoring controller 140 may be employed by a lane mark detection processor (not shown) to estimate the roadway. The spatial sensors 41 of the vehicle spatial monitoring system 40 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more vehicle(s). Such sensing systems are employed for detecting and locating objects in automotive applications and are useable with systems including, e.g., adaptive cruise control, autonomous braking, autonomous steering and side-object detection.

The spatial sensors 41 associated with the vehicle spatial monitoring system 40 are preferably positioned within the vehicle 10 in relatively unobstructed positions to monitor the spatial environment. As employed herein, the spatial environment includes external elements, including fixed objects such as signs, poles, trees, houses, stores, bridges, etc.; and, moving or moveable objects such as pedestrians and other vehicles. Each of these spatial sensors 41 provides an estimate of actual location or condition of an object, wherein said estimate includes an estimated position and standard deviation. As such, sensory detection and measurement of object locations and conditions are typically referred to as 'estimates.' It is further appreciated that the characteristics of these spatial sensors 41 are complementary, in that some are more reliable in estimating certain parameters than others. The spatial sensors 41 can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some of the spatial sensors 41 present parametric variances during operation, although overlapping coverage areas of the sensors create opportunities for sensor data fusion.

The HVAC system 44 is disposed to manage the ambient environment of the passenger compartment, including, e.g., temperature, humidity, air quality and the like, in response to operator commands that are communicated to the HVAC controller 144, which controls operation thereof. The HVAC controller 144 also includes an HVAC VHM agent 145.

The operator controls 46 can be included in the passenger compartment of the vehicle 10 and may include, by way of non-limiting examples, a steering wheel 108, an accelerator pedal, a brake pedal and an operator input device 110. The operator controls 46 and associated operator controller 146 enable a vehicle operator to interact with and direct operation of the vehicle 10 in functioning to provide passenger transportation. The operator controller 146 also includes an operator controller VHM agent 147. The operator control devices including the steering wheel 108, accelerator pedal, brake pedal, transmission range selector and the like may be omitted in some embodiments of the autonomous vehicle 10.

The steering wheel 108 can be mounted on a steering column 109 with the input device 110 mechanically mounted on the steering column 109 and configured to communicate with the operator controller 146. Alternatively, the input device 110 can be mechanically mounted proximate to the steering column 109 in a location that is convenient to the vehicle operator. The input device 110, shown herein as a stalk projecting from column 109, can include an interface device by which the vehicle operator may command vehicle operation in one or more autonomic control modes, e.g., by commanding activation of element(s) of the autonomic vehicle control system 20. The mechanization of the input device 110 is illustrative. The input device 110 may be mechanized in any one or more of a plurality of devices, or may be in the form of a controller that is voice-activated, or may be another suitable system. The input device 110 preferably has control features and a location that is used by present turn-signal activation systems. Alternatively, other input devices, such as levers, switches, buttons, and voice recognition input devices can be used in place of or in addition to the input device 110.

The HMI system 42 provides for human/machine interaction, for purposes of directing operation of an infotainment system, a GPS system, a navigation system and the like, and includes an HMI controller 142. The HMI controller 142 monitors operator requests and provides information to the operator including status of vehicle systems, service and maintenance information. The HMI controller 142 can also include a global positioning/navigation system. The HMI controller 142 communicates with and/or controls operation of a plurality of operator interface devices, wherein the operator interface devices are capable of transmitting a message associated with operation of one of the autonomic vehicle control systems. The HMI controller 142 preferably also communicates with one or more devices that monitor biometric data associated with the vehicle operator, including, e.g., eye gaze location, posture, and head position tracking, among others. The HMI controller 142 is depicted as a unitary device for ease of description, but may be configured as a plurality of controllers and associated sensing devices in an embodiment of the system described herein. The HMI controller 142 also includes an HMI VHM agent 143. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI controller 142. The HUD may project information that is reflected onto an interior side of a windshield of the vehicle, in the field of view of the operator, including transmitting a confidence level associated with operating one of the autonomic vehicle control systems. The HUD may also provide augmented reality information, such as lane location, vehicle path, directional and/or navigational information, and the like. HUD and related systems are understood by those skilled in the art.

The vehicle lighting, illumination and external signaling system 48 includes a plurality of headlamps, taillamps, brake lamps, marker lamps, signal lamps, and the like, which are controllable via the lighting controller 148. The lighting controller 148 is in communication with ambient light sensors, the GPS system, and the navigation system, and executes control routines that selectively illuminate various ones of the headlamps, taillamps, brake lamps, marker lamps, signal lamps based upon the ambient light, the direction of intended travel from the GPS and navigation systems, and other factors. Other factors may include an override command to illuminate the vehicle lamps in a construction zone. The lighting controller 148 also includes a lighting VHM agent 149.

In one embodiment, the vehicle 10 is configured to communicate with a communication network 285, including communicating between a controller associated with an intelligent highway system and the vehicle 10. An intelligent highway system can be configured to monitor locations, speeds and trajectories of a plurality of vehicles, with such information employed to facilitate control of one or a plurality of similarly-situated vehicles. This can include communicating geographic location, forward velocity and acceleration rate of one or more vehicles in relation to the vehicle 10. In one embodiment, the vehicle 10 is configured to communicate with an off-board controller 280 via the communication network 285, wherein the off-board controller is remotely located.

The VHM controller 120 is configured to autonomously monitor health of various on-board subsystems that perform one or more functions related to autonomous vehicle operation. The VHM controller 120 includes a controller architecture that is configured with multilayer hierarchical VHM data processing, collection, and storage employing the plurality of VHM agents that are associated with a VHM master controller that can communicate with the off-board controller 280. This configuration can serve to reduce data processing complexity, data collection and data storage costs. The VHM controller 120 provides a centralized system monitoring and a distributed system monitoring arrangement with data collection via the VHM master controller and the plurality of VHM agents to provide a rapid response time and an integrated vehicle/system level coverage. The VHM controller 120 can also include a fault mitigation controller and a redundant VHM master controller to verify integrity of VHM information employed by the fault mitigation controller.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The terms "prognosis", "prognostics", and related terms are associated with data monitoring and algorithms and evaluations that render an advance indication of a likely future event associated with a component, a subsystem, or a system. Prognostics can include classifications that include a first state that indicates that the component, subsystem, or system is operating in accordance with its specification ("Green" or "G"), a second state that indicates deterioration in the operation of the component, subsystem, or system ("Yellow" or "Y"), and a third state that indicates a fault in the operation of the component, subsystem, or system ("Red" or "R"). The terms "diagnostics", "diagnosis" and related terms are associated with data monitoring and algorithms and evaluations that render an indication of presence or absence of a specific fault with a component, subsystem or system. The term "mitigation" and related terms are associated with operations, actions or control routine that operate to lessen the effect of a fault in a component, subsystem or system.

The telematics controller 125 includes a wireless telematics communication system capable of extra-vehicle communications, including communicating with the communication network system 285 having wireless and wired communication capabilities. The telematics controller 125 is capable of extra-vehicle communications that includes short-range vehicle-to-vehicle (V2V) communication. Alternatively or in addition, the telematics controller 125 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with the off-board controller 280 via the communication network 285. Alternatively or in addition, the telematics controller executes the extra-vehicle communication directly by communicating with the off-board controller 280 via the communication network 285.

Prognostic classification routines to determine a prognostic, i.e., R/Y/G, for each of the subsystems can be executed in the VHM controller 120. The prognostic classification routines can detect occurrence of a Green prognostic associated with one of the vehicle subsystems and associated controllers of the autonomic vehicle control system 20, and the VHM controller 120 can block associated data transmission off board via the communication network 285 to reduce data communication load to the off-board controller 280. Alternatively, the transmission of a Green prognostic can be in the form of a simple acknowledgement of Green determination for a component, subsystem, or system of one of the vehicle systems and associated controllers of the autonomic vehicle control system 20 with a time stamp, thus minimizing the data transmission load to the off-board controller 280.

The VHM controller 120 includes executable routines that evaluate on-vehicle devices that monitor the spatial environment of the autonomous vehicle 10, including, e.g., the spatial sensors 41, the vehicle spatial monitoring system 40, spatial monitoring controller 140 and spatial monitoring VHM agent 141 that are described with reference to FIG. 1.

Figure 2:
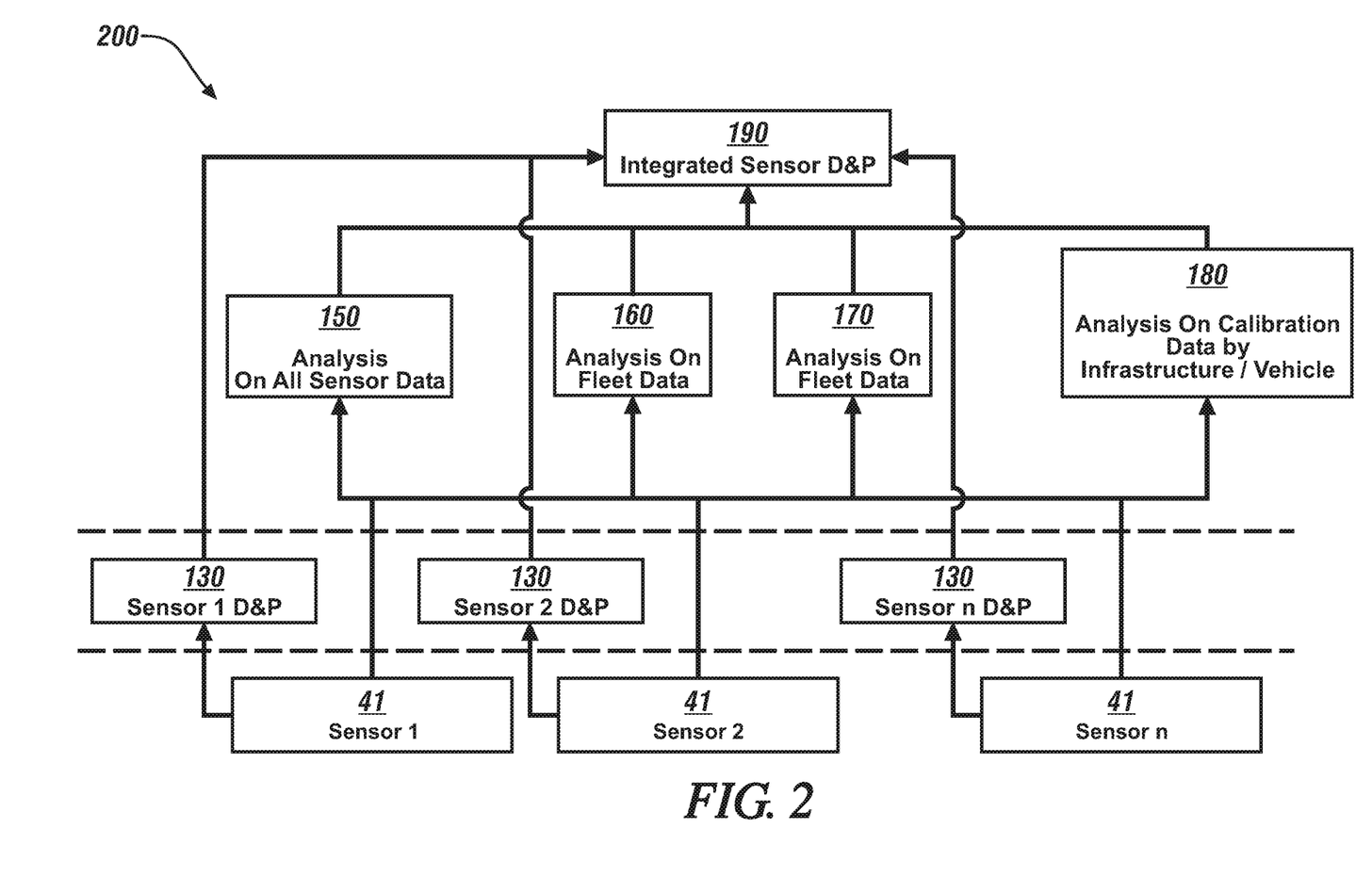
FIG. 2 schematically shows an information flow diagram depicting an analysis architecture for executing an integrated evaluation of a spatial sensor, e.g., one of the spatial sensors that is employed on the vehicle spatial monitoring system of the autonomous vehicle that is described with reference to FIG. 1, in accordance with the disclosure.

FIG. 2 schematically shows an information flow diagram depicting an analysis architecture 200 for executing an integrated evaluation of a spatial sensor, e.g., the subject spatial sensor 41 that is employed on the vehicle spatial monitoring system 40 of the autonomous vehicle 10 that is described with reference to FIG. 1. In one embodiment, the control routines and calibrations are resident in and executed by the spatial monitoring controller 140.

The analysis architecture 200 includes a sensor-level diagnosis/prognosis (D&P) routine 130 for monitoring the subject spatial sensor 41, an on-vehicle-level diagnosis/prognosis routine 150 for monitoring the subject spatial sensor 41, a historical data diagnosis/prognosis routine 160 for monitoring the spatial sensor 41, a fleet data diagnosis/prognosis routine 170 for monitoring the subject spatial sensor 41, and a calibration vehicle data diagnosis/prognosis routine 180 for monitoring the subject spatial sensor 41. An integrated on-vehicle-level diagnosis/prognosis routine 190 compiles the results from the foregoing routines to determine an integrated evaluation of the subject spatial sensor 41, which can be communicated to the vehicle operator or to the off-board controller 280 for service. Any one of the spatial sensors 41' can be designated as the subject spatial sensor 41 for purposes of evaluation. Each of the spatial sensors 41 is disposed to monitor a field of view that is proximal to the vehicle 10, and includes executable routines providing diagnostic and prognostic analyses based thereon.

A detailed execution of the analysis architecture 200 can be implemented via an integrated spatial sensor SOH determination routine 300 to generate a SOH result for the subject spatial sensor 41, which can be executed in the VHM controller 120. The integrated spatial sensor SOH determination routine 300 can be triggered to execute at any desired time, and is executed as a control routine stored in a memory device in one of the vehicle controllers.

Figure 3:
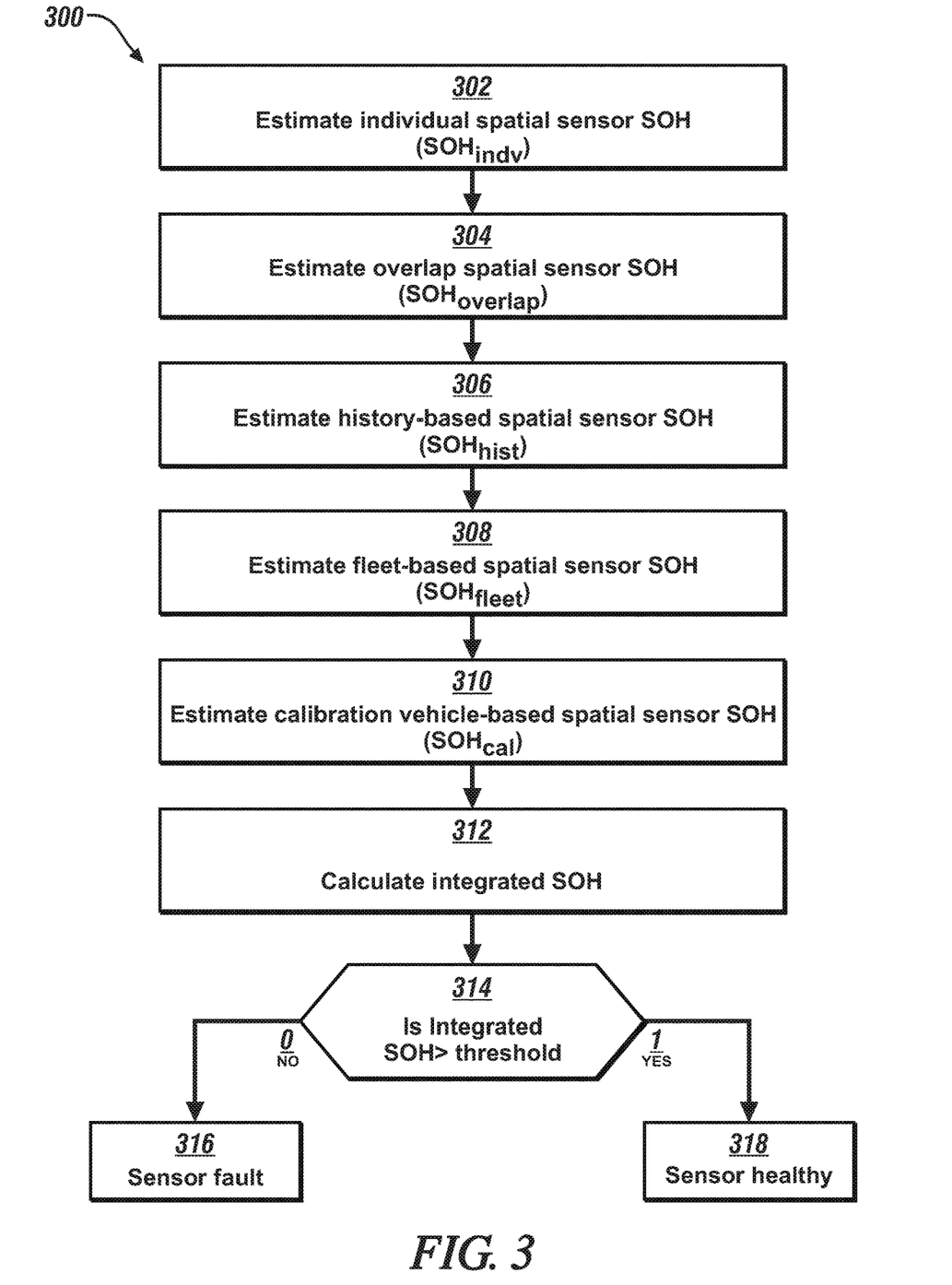
FIG. 3 schematically shows an embodiment of the integrated spatial sensor SOH determination routine, in accordance with the disclosure.

FIG. 3 schematically shows an embodiment of the integrated spatial sensor SOH determination routine 300. Table 1 is provided as a key wherein the numerically labeled blocks and the corresponding functions are set forth as follows, corresponding to the integrated spatial sensor SOH determination routine 300. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 302 | Estimate individual spatial sensor SOH |
| 304 | Estimate overlap spatial sensor SOH |
| 306 | Estimate history-based spatial sensor SOH |
| 308 | Estimate fleet-based spatial sensor SOH |
| 310 | Estimate calibration vehicle-based spatial sensor SOH |
| 312 | Calculate integrated SOH |
| 314 | Is integrated SOH > threshold? |
| 316 | Indicate fault with spatial sensor |
| 318 | Indicate no fault with spatial sensor |

Execution of the integrated spatial sensor SOH determination routine 300 may proceed as follows. The steps of the integrated spatial sensor SOH determination routine 300 may be executed in a suitable order, and are not limited to the order described with reference to FIG. 3.

An individual spatial sensor SOH for one of the on-vehicle spatial sensors 41, (hereafter "the subject spatial sensor 41") can be determined based upon internal monitoring of operating conditions, such as is provided by the spatial monitoring VHM agent 141 (302). This can include monitoring internal calibrations, power levels, etc. to verify signal integrity and other parameters derived from monitoring the subject spatial sensor 41. The subject spatial sensor 41 has a field of view 43 that may overlap with fields of view from the other spatial sensors, which are indicated by numeral 41'.

An overlap spatial sensor SOH for the subject spatial sensor 41 can be determined employing information from one or more of the other on-vehicle spatial sensors 41 that have a field of view that overlaps with the field of view associated with the subject spatial sensor 41 (304). The overlap spatial sensor SOH for the subject spatial sensor 41 can be determined based upon a correlation analysis of data generated by a second of the spatial sensors, or by two or more of the spatial sensors 41. This includes seeking to detect inconsistencies between the data related to the overlapping fields of view of the subject spatial sensor 41 and the second of the spatial sensors 41. A high value for the overlap spatial sensor SOH can be associated with high levels of consistencies between the overlap data, and a low value for the overlap spatial sensor SOH can be associated with low levels of consistencies between the overlap data.

A history-based spatial sensor SOH for the subject spatial sensor 41 can be determined employing data from the subject spatial sensor 41 that has been previously captured for a pre-defined geographic location and an associated GPS location and time/date stamp (306). The routine can compare historical data for the same GPS location with the subject spatial sensor 41 having an orientation and field of view relative to the geographic location that is consistent with the geographic location associated with the historical data. This includes seeking to detect inconsistencies between the presently captured data from the subject spatial sensor 41 and the historical data. A high value for the history-based spatial sensor SOH can be associated with high levels of consistencies between the presently captured data and the historical data from the subject spatial sensor 41, and a low value for the overlap spatial sensor SOH can be associated with low levels of consistencies between the presently captured data and the historical data from the subject spatial sensor 41 at the geographic location.

A fleet-based spatial sensor SOH for the subject spatial sensor 41 can be determined by comparing data from the subject spatial sensor 41 at a pre-defined geographic location with fleet data that is generated from spatial sensors disposed on other vehicles at the pre-defined geographic location (308). The fleet data can be stored in a memory device that is a part of the off-board controller 280. The routine can compare the fleet data for the same GPS location with data from the subject spatial sensor 41 at a common orientation and field of view for the pre-defined geographic location. This includes seeking to detect inconsistencies between the presently captured data from the subject spatial sensor 41 and the fleet data. A high value for the fleet-based spatial sensor SOH can be associated with high levels of consistencies between the presently captured data for the subject spatial sensor 41 and the fleet data, and a low value for the fleet-based spatial sensor SOH can be associated with low levels of consistencies between the presently captured data for the subject spatial sensor 41 and the fleet data at the geographic location.

A calibration-based spatial sensor SOH for the subject spatial sensor 41 can be determined by comparing data from the subject spatial sensor 41 at a pre-defined geographic location with data captured by spatial sensors that are disposed on a calibration vehicle at the pre-defined geographic location (310). The calibration data can be stored in a memory device that is a part of the off-board controller 280. The routine can compare the data from the subject spatial sensor 41 and calibration data from the calibration vehicle at a common orientation and field of view for the geographic location. This includes seeking to detect inconsistencies between the presently captured data from the subject spatial sensor 41 and the calibration data. A high value for the calibration-based spatial sensor SOH can be associated with high levels of consistencies between the presently captured data for the subject spatial sensor 41 and the fleet data, and a low value for the calibration-based spatial sensor SOH can be associated with low levels of consistencies between the presently captured data for the subject spatial sensor 41 and the fleet data at the geographic location.

The routine 300 determines an integrated SOH for the subject spatial sensor 41 (312), which can be in the form of a weighted average of all or selected ones of the individual spatial sensor SOH, the overlap spatial sensor SOH, the history-based spatial sensor SOH, the fleet-based spatial sensor SOH and the calibration-based spatial sensor SOH. In one embodiment, the integrated SOH can be calculated as follows:

$$SOH_{INT} = W_{indv}*SOH_{indv} + W_{overlap}*SOH_{overlap} + W_{hist}*SOH_{hist} + W_{fleet}*SOH_{fleet} + W_{cal}*SOH_{cal} \quad [1]$$

wherein $SOH_{INT}$ is the integrated SOH;
$SOH_{indv}$ is the individual spatial sensor SOH;
$SOH_{overlap}$ is the overlap spatial sensor SOH;
$SOH_{hist}$ is the history-based spatial sensor SOH;
$SOH_{fleet}$ is the fleet-based spatial sensor SOH; and
$SOH_{cal}$ is the calibration-based spatial sensor SOH;
$W_{indv}$ is a weighting factor for the individual spatial sensor SOH;
$W_{overlap}$ is a weighting factor for the overlap spatial sensor SOH;
$W_{hist}$ is a weighting factor for the history-based spatial sensor SOH;
$W_{fleet}$ is a weighting factor for the fleet-based spatial sensor SOH; and $W_{cal}$ is a weighting factor for the calibration-based spatial sensor SOH.

The weighting factors can be determined based upon system-specific factors, and in one embodiment, the overall relation between the weighting factors is as follows:

$$W_{indv}+W_{overlap}+W_{hist}+W_{fleet}+W_{cal}=1 \qquad [2]$$

The integrated SOH is compared to a threshold SOH (314) to evaluate its fitness for use. When the integrated SOH is greater than the threshold SOH (314)(1), it is an indication that the subject spatial sensor 41 is fit for use in monitoring the spatial environment that is proximal to the vehicle 10 and this result can be indicated to the vehicle operator via one of the operator interface devices of the HMI system 42 (318). This result can also be communicated to the off-board controller 280.

When the integrated SOH is less than the threshold SOH (314)(0), it is an indication that the subject spatial sensor 41 is not fit for use in monitoring the spatial environment that is proximal to the vehicle 10 and this result can be indicated to the vehicle operator via one of the operator interface devices of the HMI system 42 (316). This result can also be communicated to the off-board controller 280, which can communicate the result to a service center for scheduling vehicle service. The controller can also implement mitigation efforts employing information from other of the spatial sensors 41' to monitor the field of view.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for evaluating a subject spatial sensor disposed on an autonomous vehicle, wherein the subject spatial sensor is disposed to monitor a spatial environment proximal to the autonomous vehicle, and wherein the autonomous vehicle includes a telematics device disposed to communicate with an off-board controller, the method comprising:

determining a first state of health (SOH) parameter for the subject spatial sensor based upon internal monitoring of the subject spatial sensor, wherein a first field of view is associated with the subject spatial sensor, wherein the first SOH parameter is determined based upon signal integrity of the subject spatial sensor, wherein the first SOH parameter has a high value when the signal integrity of the subject spatial sensor is in accordance with its specification, and wherein the first SOH parameter has a low value when the signal integrity of the subject spatial sensor has deteriorated;

determining a second SOH parameter for the subject spatial sensor based upon a correlation analysis of data generated by a second spatial sensor disposed on the autonomous vehicle;

determining a third SOH parameter for the subject spatial sensor based upon historical data for the subject spatial sensor that is associated with a geographic location;

determining a fourth SOH parameter for the subject spatial sensor based upon a correlation analysis with an input from a third spatial sensor that is disposed on a second vehicle, wherein the input from the third spatial sensor includes data associated with the geographic location;

determining a fifth SOH parameter for the subject spatial sensor based upon a correlation analysis with an input from a calibration spatial sensor disposed on a calibration vehicle, wherein the input from the calibration spatial sensor includes data associated with the geographic location;

determining an integrated SOH parameter for the subject spatial sensor based upon the first, second, third, fourth and fifth SOH parameters;

comparing the integrated SOH parameter with a threshold SOH;

detecting a fault in the subject spatial sensor when the integrated SOH parameter is greater than the threshold SOH;

indicating, via an operator interface device, the fault for the subject spatial sensor; and controlling operation of the autonomous vehicle based upon the data generated by the second spatial sensor in response to the fault for the subject spatial sensor.

2. The method of claim 1, wherein determining the integrated SOH parameter for the subject spatial sensor based upon the first, second, third, fourth and fifth SOH parameters comprises determining a weighted average of the first, second, third, fourth and fifth SOH parameters.

3. The method of claim 1, wherein the second SOH parameter is determined based upon a correlation analysis of data generated by the second spatial sensor, wherein the second spatial sensor has a second field of view that overlaps with a portion of the first field of view.

4. The method of claim 3, wherein a low value for the second SOH parameter is associated with a low value that is output from the correlation analysis, and a high value for the second SOH parameter is associated with a high value that is output from the correlation analysis.

5. The method of claim 1, wherein the third SOH parameter is determined based upon historical data for the subject spatial sensor that is associated with the geographic location and is at an orientation that is consistent with the data for the subject spatial sensor.

6. The method of claim 5, wherein a low value for the third SOH parameter is associated with a low value that is output from the correlation analysis, and a high value for the third SOH parameter is associated with a high value that is output from the correlation analysis.

7. The method of claim 1, wherein the fourth SOH parameter is determined based upon a correlation analysis with input from the third spatial sensor disposed on the second vehicle that is associated with the geographic location and is at an orientation that is consistent with the data for the subject spatial sensor.

8. The method of claim 7, wherein a low value for the fourth SOH parameter is associated with a low value that is output from the correlation analysis, and a high value for the fourth SOH parameter is associated with a high value that is output from the correlation analysis.

9. The method of claim 1, wherein the fifth SOH parameter is determined based upon a correlation analysis with the input from the calibration spatial sensor disposed on the calibration vehicle that is associated with the geographic location and is at an orientation that is consistent with the data for the subject spatial sensor.

10. The method of claim 9, wherein a low value for the fifth SOH parameter is associated with a low value that is output from the correlation analysis, and a high value for the fifth SOH parameter is associated with a high value that is output from the correlation analysis.

11. The method of claim 1, wherein the subject spatial sensor includes a camera.

12. The method of claim 1, wherein the subject spatial sensor includes one of a radar device and a lidar device.

13. The method of claim 1, further comprising indicating that the subject spatial sensor is fit for use in monitoring the spatial environment that is proximal to the vehicle when the integrated SOH parameter is less than the threshold SOH.

14. The method of claim 1, further comprising communicating the fault to an off-board controller.

15. The method of claim 1, wherein the autonomous vehicle includes an autonomic vehicle control system, and wherein controlling operation of the autonomous vehicle based upon the data generated by the second spatial sensor in response to the fault for the subject spatial sensor comprises controlling the autonomic vehicle control system based upon the data generated by the second spatial sensor.

16. The method of claim 15, wherein the autonomic vehicle control system is arranged to perform a driving task, and wherein controlling operation of the autonomous vehicle based upon the data generated by the second spatial sensor in response to the fault for the subject spatial sensor comprises controlling the autonomic vehicle control system to perform the driving task based upon the data generated by the second spatial sensor.

17. The method of claim 16, wherein the driving task comprises one of cruise control, adaptive cruise control, lane-change warning, intervention and control, automatic parking, acceleration, or braking; and wherein controlling the autonomic vehicle control system to perform the driving task based upon the data generated by the second spatial sensor comprises controlling the autonomic vehicle control system to perform one of cruise control, adaptive cruise control, lane-change warning, intervention and control, automatic parking, acceleration, or braking based upon the data generated by the second spatial sensor.

18. An autonomous vehicle, comprising:
a subject spatial sensor disposed to monitor a spatial environment proximal to the autonomous vehicle, wherein the subject spatial sensor includes a first field of view;
a second spatial sensor disposed to monitor a spatial environment proximal to the autonomous vehicle, wherein the second spatial sensor includes a second field of view that overlaps with a portion of the first field of view;
a telematics device disposed to communicate with an off-board controller;
a human-machine interface (HMI) device;
a controller, in communication with the first and second spatial sensors, the HMI device, the telematics device and the off-board controller, the controller including an instruction set, the instruction set executable to:
determine a first state of health (SOH) parameter for the subject spatial sensor based upon internal monitoring of the subject spatial sensor, wherein a first field of view is associated with the subject spatial sensor;
determine a second SOH parameter for the subject spatial sensor based upon a correlation analysis of data generated by the second spatial sensor disposed on the autonomous vehicle;
determine a third SOH parameter for the subject spatial sensor based upon historical data for the subject spatial sensor that is associated with a geographic location;
determine a fourth SOH parameter for the subject spatial sensor based upon a correlation analysis with an input from a third spatial sensor disposed on a second vehicle, wherein the input from the third spatial sensor disposed on the second vehicle is communicated via the telematics device, and wherein the input from the third spatial sensor includes data associated with the geographic location;
determine a fifth SOH parameter for the subject spatial sensor based upon a correlation analysis with an input from a calibration spatial sensor disposed on a calibration vehicle, wherein the input from the calibration spatial sensor disposed on the calibration vehicle is communicated via the telematics device, and wherein the input from the calibration spatial sensor includes data associated with the geographic location;
determine an integrated SOH parameter for the subject spatial sensor based upon the first, second, third, fourth and fifth SOH parameters;
compare the integrated SOH parameter with a threshold SOH;
detect a fault in the subject spatial sensor when the integrated SOH parameter is greater than the threshold SOH;
indicate, via the HMI device, the fault for the subject spatial sensor; and
control operation of the autonomous vehicle based upon the data generated by the second spatial sensor in response to the fault for the subject spatial sensor.

19. A method for evaluating a subject spatial sensor disposed on an autonomous vehicle, wherein the subject spatial sensor is disposed to monitor a spatial environment proximal to the autonomous vehicle, and wherein the autonomous vehicle includes a telematics device disposed to communicate with an off-board controller, the method comprising:
determining a first, second, third, fourth and fifth state of health (SOH) parameters for the subject spatial sensor, wherein the first SOH is determined based upon internal monitoring of the subject spatial sensor, wherein the second SOH parameter is determined based upon a correlation analysis of data generated by a second spatial sensor disposed on the autonomous vehicle, wherein the third SOH parameter is determined based upon historical data for the subject spatial sensor, wherein the fourth SOH parameter is determined based upon a correlation analysis with an input from a third spatial sensor disposed on a second vehicle, and wherein the fifth SOH parameter is determined based upon a correlation analysis with an input from a calibration spatial sensor disposed on a calibration vehicle;

determining an integrated SOH parameter for the subject spatial sensor based upon the first, second, third, fourth and fifth SOH parameters; and comparing the integrated SOH parameter with a threshold SOH;

detecting a fault in the subject spatial sensor when the integrated SOH parameter is greater than the threshold SOH; and indicating, via an operator interface device, the fault for the subject spatial sensor; and controlling operation of the autonomous vehicle based upon the data generated by the second spatial sensor in response to the fault for the subject spatial sensor.

* * * * *